June 7, 1949.　　　J. McFARLAND　　　2,472,670
HAND TRUCK
Filed March 28, 1946
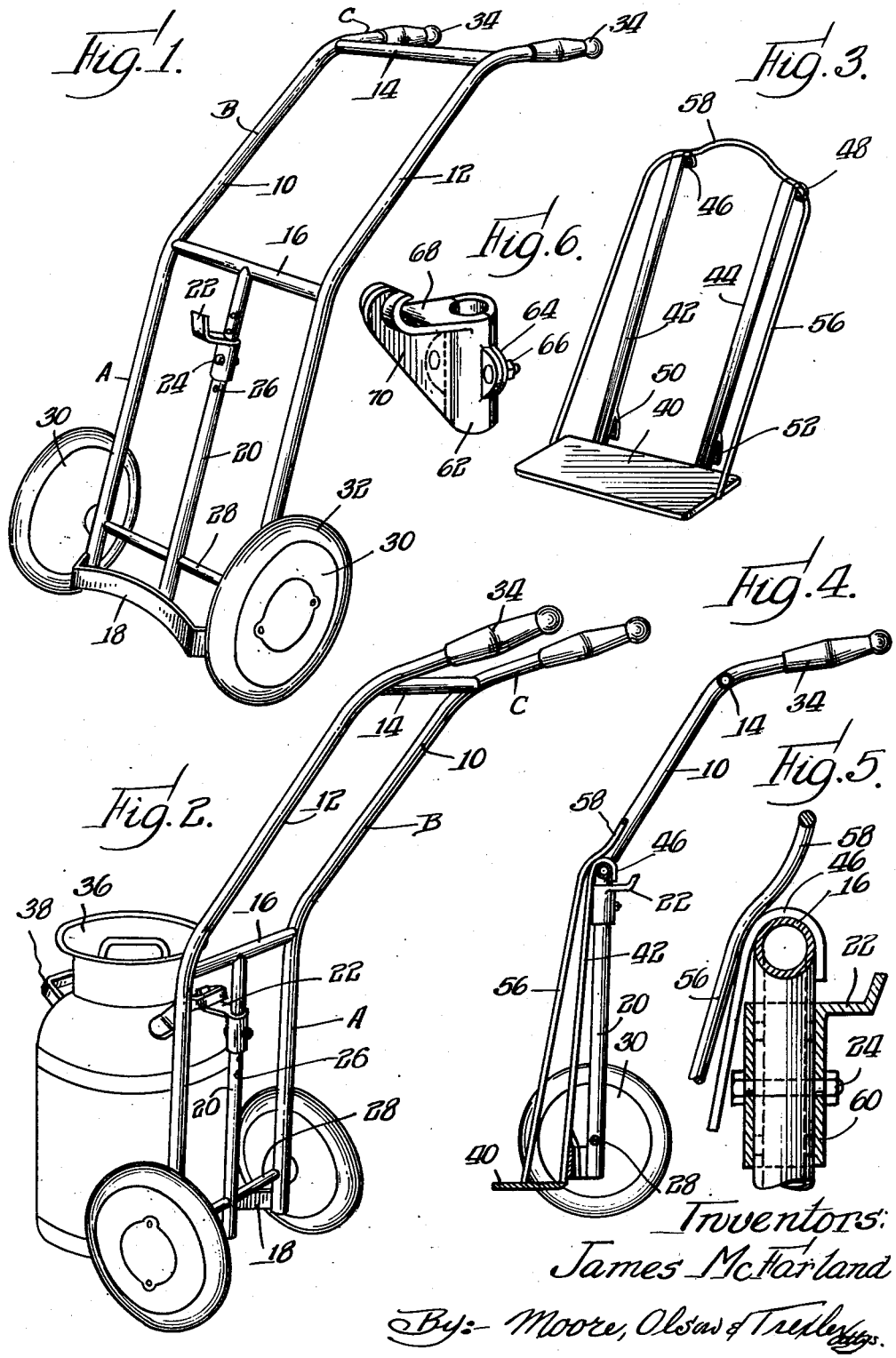

Patented June 7, 1949

2,472,670

UNITED STATES PATENT OFFICE 2,472,670

HAND TRUCK

James McFarland, Racine, Wis.

Application March 28, 1946, Serial No. 657,781

3 Claims. (Cl. 214—65.4)

1

The present invention relates to hand trucks, and more particularly to a hand truck designed for use on a farm.

On a farm there is frequently need for a hand truck for moving about various articles such as milk cans and feed bags. In general the more conventional type of hand trucks which are more adapted to the handling of freight are not of the proper design for use on a farm. In general the wheels or casters are relatively small so that it is difficult to move such type of truck over the numerous irregularities found on a farm. Furthermore the usual type of truck will not retain in position a container such as a milk can and yet milk cans must be handled daily. Such trucks furthermore have the disadvantage of being relatively heavy and unwieldy and of being without sufficient leverage. Therefore, it would be highly desirable to provide an improved type of hand truck particularly designed for farm utility which readily will carry such articles as milk cans and feed bags.

In accordance with the present invention an improved type of hand truck of relatively simple yet pleasing design is constructed with relatively large wheels and suitable accessories or devices which are placed in operation dependent upon whether a milk can, a feed bag or other article is to be transported by the truck. In the preferred form of the invention a hand truck is fabricated of tubular material welded together to provide a light weight yet relatively strong structure which is free from protruding parts such as bolts and nuts. In order to carry milk cans with the greatest ease, the hand truck is provided with a concave surface adjacent its lower extremity for engagement with the curved surface of the milk can. An adjustable hook is provided for engaging the handle of the milk can. Adjustability is provided to accommodate different size and types of milk cans.

In order to use the truck for other purposes a hook is formed so that it may be displaced so as not to protrude forwardly, particularly when it is desired to carry feed bags. For carrying feed bags and other articles a removable platform is provided which is retained in position by a plurality of supporting hooks so that it is readily attached and detached without the manipulation of any fastening devices.

It is, therefore, an object of the present invention to provide an improved form of hand truck which is relatively simple and economical to manufacture.

It is a further object of the present invention

2 to provide an improved hand truck having a carrying or supporting hook which may be adjustably positioned as to height and which may be positioned so as to be out of the way when the truck is to be used for other purposes.

Other and further objects of the present invention subsequently will become apparent by reference to the following description taken in connection with the accompanying drawing wherein Figure 1 is a perspective front view of the hand truck constructed in accordance with the present invention when the truck is in condition for carrying or transporting milk cans;

Figure 2 is a perspective view showing the cart in position preparatory to transporting a milk can;

Figure 3 is a perspective view of the demountable platform provided for carrying such articles as feed bags;

Figure 4 is a cross sectional side view which illustrates the manner in which the platform of Figure 3 is supported by the truck;

Figure 5 is an enlarged view partially in cross section of a portion of the truck seen in Figure 4; and Figure 6 illustrates a modified form of hook which may be employed in place of the type of hook illustrated in previous figures.

Referring more particularly to the drawing, there is illustrated a hand truck which preferably is formed of two parallel members 10 and 12 which in the preferred form are of a tubular metal stock. Each of the members 10 and 12 is bent at a plurality of points so as to form three sections A, B and C which are at slight angles to each other. The two parallel tubular members 10 and 12 are secured in position by a plurality of transversely arranged tubular members 14 and 16 which as shown are preferably located in the proximity of the bends between the various sections. At the lower extremity of the members 10 and 12 there is provided a concave transversely arranged member 18 preferably formed out of strip metal stock and welded to the lower extremities of the members 10 and 12. Another tubular member 20 is located between the members 10 and 12 and extends from the transverse member 16 to the concave transverse member 18. The member 20 is welded in position and is provided with an adjustably positioned hook 22 which is retained in the desired position by a fastening means such as a bolt 24 which passes through one of a plurality of holes 26.

The truck frame thus described is provided with a transverse axle 28 which carries at its outer ends a pair of wheels 30. Preferably the wheels 30 are of large diameter as compared to the conventional casters or wheels employed on freight transporting trucks. It furthermore may be desirable to employ rubber tires 32 on wheels 30. The upper extremities of the parallel members 10 and 12 are provided with hand grips 34.

The perspective view in Figure 2 shows the hand truck in position for raising and carrying a milk can 36 which is provided with handles 38. The hand truck is moved into proximity of the milk can so that the hook 22 is in position for engagement with one of the milk can handles 38. In order to insert the hook within the handle 38, it may be necessary to tilt the hand truck slightly beyond the perpendicular and thereby move the truck toward the perpendicular until the concave surface engages the lower cylindrical surface of the milk can 36. Thereafter further pressure may be applied to the handles 34 to raise the bottom of the milk can from the surface which is supporting it.

Figure 3 illustrates a removable platform comprising a forwardly extending supporting surface 40 which is secured to a plurality of upwardly extending members 42 and 44. Preferably the members 42 and 44 are formed of strip metal stock and terminate at the upper extremities in hooks 46 and 48. The strip metal members 42 and 44 are welded to the forwardly extending platform portion 40. Adjacent the lower ends of the members 42 and 44 there are provided hooks 50 and 52 which may be made out of shorter pieces of the strip stock which are welded to the longer pieces to form supporting hooks adapted to engage the concave transversely arranged member 18 of the hand truck. The platform 40 is furthermore welded or secured to an upwardly extending frame member 56 which may be of rod metal stock bent upwardly at the center to form a convenient handle or gripping portion 58.

Further details of the structure shown in Figure 3 will be appreciated by reference to Figures 4 and 5 from which it will be seen that the upper hooks 46 and 48 engage the transverse bar 16 and the lower hooks 50 and 52 engage the transverse bar 18. It may be assumed that the platform is to be employed for transporting such items as feed bags. In this case it is undesirable to have the hook 22 extend forwardly for fear that the hook might damage or puncture the feed bags. The hook 22 therefore is loosened and turned through 180 degrees and then secured in position by means of the bolt 24. From this it will become apparent that there has been provided an improved type of hand truck particularly suited for the most common tasks of transportation encountered in daily farm work. The tubular welded structure is relatively strong and yet light and economical to manufacture. The angular relation of the sections A, B, C of each of the side members 10 and 12 of the hand truck provide an increased moment arm for tilting the truck to carrying or transporting position. Thus the truck is readily operable by such individuals on the farm as children and women who otherwise might not be able to use the more conventional type of hand truck.

The hook 22 illustrated in the preceding figures preferably is formed of a sleeve 60 which has a forwardly extending lip portion 22 secured thereto and which may be a strip metal part welded to the tubular sleeve 60. In place of such hook, however, there may be provided a cast or forged hook such as shown in Figure 6 which has a bifurcated sleeve portion 62 secured together by suitable ears 64 and fastening bolts 66. The sleeve 62 has a forwardly extending hook portion 68 which may be reinforced by a vertical rib 70. The hook such as shown in Figure 6 may be adjustably positioned at any place along the tubular member 20 by merely tightening the bolt 66 so as to press together the ears 64 to retain the hook 68 in position by frictional engagement. Obviously of course when it is desired to use the hand truck for carrying feed bags, the bolt 66 may be loosened and the hook turned toward the rear of the truck.

While for the purpose of illustrating and describing the present invention, a preferred embodiment of the invention has been illustrated in the drawing, it is to be understood that such modifications and variations in the arrangement of the components and their configurations are contemplated as may be commensurate with the spirit and scope of the invention defined in the following claims.

This invention is hereby claimed as follows:

1. In a two-wheeled hand truck, a frame comprising two parallel upright members, each bent so as to form three sections arranged at angles to each other with the extremities of the uppermost pair of said sections constituting a pair of handles, a plurality of transverse members interconnecting said upright members, including a cross member located in the proximity of the lowermost bends in said upright members and a concave member having its extremities bent backward and interconnecting said upright members at the lower ends thereof, an intermediate upright member supported by the transverse members including said concave member and disposed between the lower portions of said first two upright members, an upturned hook carried by said intermediate member, and adjustable fastening means for connecting said hook to said intermediate member in any of a plurality of positions thereon.

2. A hand truck as defined in claim 1, wherein said fastening means is so arranged that said hook may extend either forwardly or rearwardly.

3. A hand truck as defined in claim 2, wherein the fastening means is arranged also to enable said hook to be adjustably fixed in position at different elevations on said intermediate member.

JAMES McFARLAND.

REFERENCES CITED

The following references are of record in the file of this patent:

UNITED STATES PATENTS

| Number | Name | Date |
|---|---|---|
| D. 141,673 | Bilek | June 26, 1945 |
| 448,359 | Nichols | Mar. 17, 1891 |
| 773,027 | Peck | Oct. 25, 1904 |
| 1,102,872 | Cerney | July 7, 1914 |
| 1,358,881 | Sabin | Nov. 16, 1920 |
| 1,430,698 | Stephenson | Oct. 3, 1922 |
| 1,517,901 | Gill | Dec. 2, 1924 |
| 2,028,976 | Goff | Jan. 28, 1936 |
| 2,335,579 | Chamberlin et al. | Nov. 30, 1943 |

FOREIGN PATENTS

| Number | Country | Date |
|---|---|---|
| 82,682 | Switzerland | Feb. 16, 1920 |
| 365,207 | Great Britain | 1932 |
| 497,328 | Great Britain | Dec. 14, 1938 |